US012565857B2

(12) United States Patent  
Ruiz et al.

(10) Patent No.: US 12,565,857 B2  
(45) **Date of Patent: *Mar. 3, 2026**

(54) TURBOMACHINE POWER AUGMENTATION FEATURES AND METHODS

(71) Applicant: GE Vernova Infrastructure Technology LLC, Greenville, SC (US)

(72) Inventors: Luis Fernando Gutierrez Ruiz, acu e+ee taro (MX); Daniel Ferney Hernandez Joya, acu e+ee taro (MX); Anna Swieca, Warsaw (PL); Jose Carlos Sanchez Herrera, acu e+ee taro (MX); Jose Augusto Lomenzo, Tucuman (AR)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/175,700

(22) Filed: Apr. 10, 2025

(65) Prior Publication Data

US 2025/0327422 A1 Oct. 23, 2025

(30) Foreign Application Priority Data

Apr. 18, 2024 (PL) ........................................ 448341

(51) Int. Cl.
| | | |
|---|---|---|
| *F02C 7/143* | (2006.01) | |
| *F02C 7/04* | (2006.01) | |
| *F02C 7/057* | (2006.01) | |
| *F02C 7/12* | (2006.01) | |
| *G05B 13/00* | (2006.01) | |

(Continued)

(52) U.S. Cl.
CPC .............. F02C 7/1435 (2013.01); F02C 7/04 (2013.01); F02C 7/057 (2013.01); F02C 7/12 (2013.01);

(Continued)

(58) Field of Classification Search
CPC .......... F02C 7/1435; F02C 7/04; F02C 7/057; F02C 7/12; G05B 13/00; G05B 13/026; G05B 13/04; G05B 15/00; G05B 17/00; F05D 2260/212; F05D 2260/81; F05D 2260/821

See application file for complete search history.

(56) References Cited

U.S. PATENT DOCUMENTS

| | | | |
|---|---|---|---|
| 7,293,415 B2 | 11/2007 | Hoffmann et al. | |
| 7,712,301 B1 | 5/2010 | Wagner | |

(Continued)

OTHER PUBLICATIONS

Loud et al., Gas Turbine Inlet Air Treatment, GER-3419A, Ge Power Generation, 26 Pages. Retrieved May 22, 2023 from Webpage: https://www.ge.com/content/dam/gepower-new/global/en_US/downloads/gas-new-site/resources/reference/ger-3419a-gas-turbine-inlet-air-treatment.pdf.

*Primary Examiner* — Kyle Robert Thomas  
(74) *Attorney, Agent, or Firm* — Dority & Manning, P.A.

(57) ABSTRACT

A method of operating a turbomachine includes producing an estimate of a power gain resulting from operation of one or more power augmentation features of the turbomachine using a statistical model and producing an estimate of an economic benefit resulting from operation of the one or more power augmentation features of the turbomachine using an economic model. The method further includes activating the one or more power augmentation features of the turbomachine based on the estimate of the economic benefit.

20 Claims, 8 Drawing Sheets

(51) Int. Cl.
| | |
|---|---|
| *G05B 13/02* | (2006.01) |
| *G05B 13/04* | (2006.01) |
| *G05B 15/00* | (2006.01) |
| *G05B 17/00* | (2006.01) |

(52) U.S. Cl.
CPC ........... *G05B 13/00* (2013.01); *G05B 13/026* (2013.01); *G05B 13/04* (2013.01); *G05B 15/00* (2013.01); *G05B 17/00* (2013.01); *F05D 2260/212* (2013.01); *F05D 2260/81* (2013.01); *F05D 2260/821* (2013.01)

(56) References Cited

U.S. PATENT DOCUMENTS

| | | | |
|---|---|---|---|
| 8,720,258 B2 | 5/2014 | Meisner et al. | |
| 8,751,423 B2 | 6/2014 | Pandey et al. | |
| 9,850,816 B2 | 12/2017 | Zhang et al. | |
| 9,957,843 B2 * | 5/2018 | Wichmann | ............ F01K 13/02 |
| 11,649,766 B1 | 5/2023 | Yeung et al. | |
| 12,196,140 B1 | 1/2025 | Vega Paez et al. | |
| 2010/0326083 A1 | 12/2010 | Bland | |
| 2011/0106747 A1 | 5/2011 | Singh et al. | |
| 2015/0184550 A1 | 7/2015 | Wichmann et al. | |
| 2015/0185716 A1 | 7/2015 | Wichmann et al. | |
| 2016/0146118 A1 | 5/2016 | Wichmann et al. | |
| 2016/0147204 A1 | 5/2016 | Wichmann et al. | |
| 2016/0258361 A1 | 9/2016 | Tiwari et al. | |
| 2016/0261115 A1 | 9/2016 | Asati et al. | |
| 2016/0281607 A1 | 9/2016 | Asati et al. | |
| 2016/0312703 A1 | 10/2016 | Ribarov et al. | |
| 2017/0159675 A1 | 6/2017 | Sennoun et al. | |
| 2017/0364043 A1 | 12/2017 | Ganti et al. | |
| 2020/0248622 A1 | 8/2020 | Crowley et al. | |

* cited by examiner

TURBOMACHINE POWER AUGMENTATION FEATURES AND METHODS

CROSS-REFERENCE TO RELATED APPLICATION

This application claims priority pursuant to 35 U.S.C. 119(a) to Polish Application No. P.448341, filed Apr. 18, 2024, which application is incorporated herein by reference in its entirety.

BACKGROUND

The subject matter disclosed herein relates generally to turbomachines, and, more specifically, to methods and systems for operating turbomachines.

Turbomachines, such as gas turbines, aero-derivatives, or the like, generally include, in serial flow order, a compressor, a combustion section and a turbine. In particular, configurations the turbomachine includes one or more power augmentation features, such as an inlet system positioned upstream from an inlet to the compressor and/or a spray intercooling system positioned and configured to direct a spray of water into a space within the compressor. The inlet system generally includes various filters, cooling coils, moisture separators, and/or other devices which may be used to purify, modify the temperature and/or humidity of, and otherwise condition air or other working fluid entering the turbomachine. Similarly, the spray intercooling system may be used to cool the air at one or more stages of the compressor.

For example, the cooling coils of the inlet system may be or may include evaporative cooling coils which use water, and the spray intercooling system may also consume an amount of water. Operation of the power augmentation features may incur additional costs, such as the cost of water used in the evaporative cooling coils or sprayed into the compressor, energy costs for operating one or more pumps, and/or other costs. In some cases, operating one or more power augmentation features at all or above a certain level (e.g., above a certain degree of cooling, filtering, and/or drying the air) may incur more additional costs than would be desired in view of the increased power output provided by such augmentation. For example, the price per unit (e.g., kilowatt) of power for the additional power output may not be high enough to offset the cost of operating the power augmentation features (or operating above a certain level), depending on various factors such as the market rate for power produced, ambient conditions (e.g., barometric pressure, temperature, and/or humidity), and other factors.

Accordingly, improved power augmentation features for a turbomachine and improved methods of operating such features would be useful. Systems and methods which optimize operation of the power augmentation features to maximize economic benefit are desired in the art.

BRIEF SUMMARY

Aspects and advantages of systems and methods in accordance with the present disclosure will be set forth in part in the following description, or may be obvious from the description, or may be learned through practice of the technology.

In accordance with one embodiment, a method of operating a turbomachine is provided. The method includes producing an estimate of a power gain resulting from operation of one or more power augmentation features of the turbomachine using a statistical model and producing an estimate of an economic benefit resulting from operation of the one or more power augmentation features of the turbomachine using an economic model. The method further includes activating the one or more power augmentation features of the turbomachine based on the estimate of the economic benefit.

In accordance with another embodiment, a turbomachine is provided. The turbomachine includes one or more power augmentation features and a controller in operative communication with the one or more power augmentation features. The controller is configured for producing an estimate of a power gain resulting from operation of the one or more power augmentation features of the turbomachine using a statistical model and producing an estimate of an economic benefit resulting from operation of the one or more power augmentation features of the turbomachine using an economic model. The controller is further configured for activating the one or more power augmentation features of the turbomachine based on the estimate of the economic benefit.

These and other features, aspects and advantages of the present systems and methods will become better understood with reference to the following description and appended claims. The accompanying drawings, which are incorporated in and constitute a part of this specification, illustrate embodiments of the technology and, together with the description, explain the principles of the technology.

BRIEF DESCRIPTION OF THE DRAWINGS

A full and enabling disclosure of the present systems and methods, including the best mode of making and using the present systems and methods, directed to one of ordinary skill in the art, is set forth in the specification, which refers to the appended figures.

DETAILED DESCRIPTION

Figure 1:
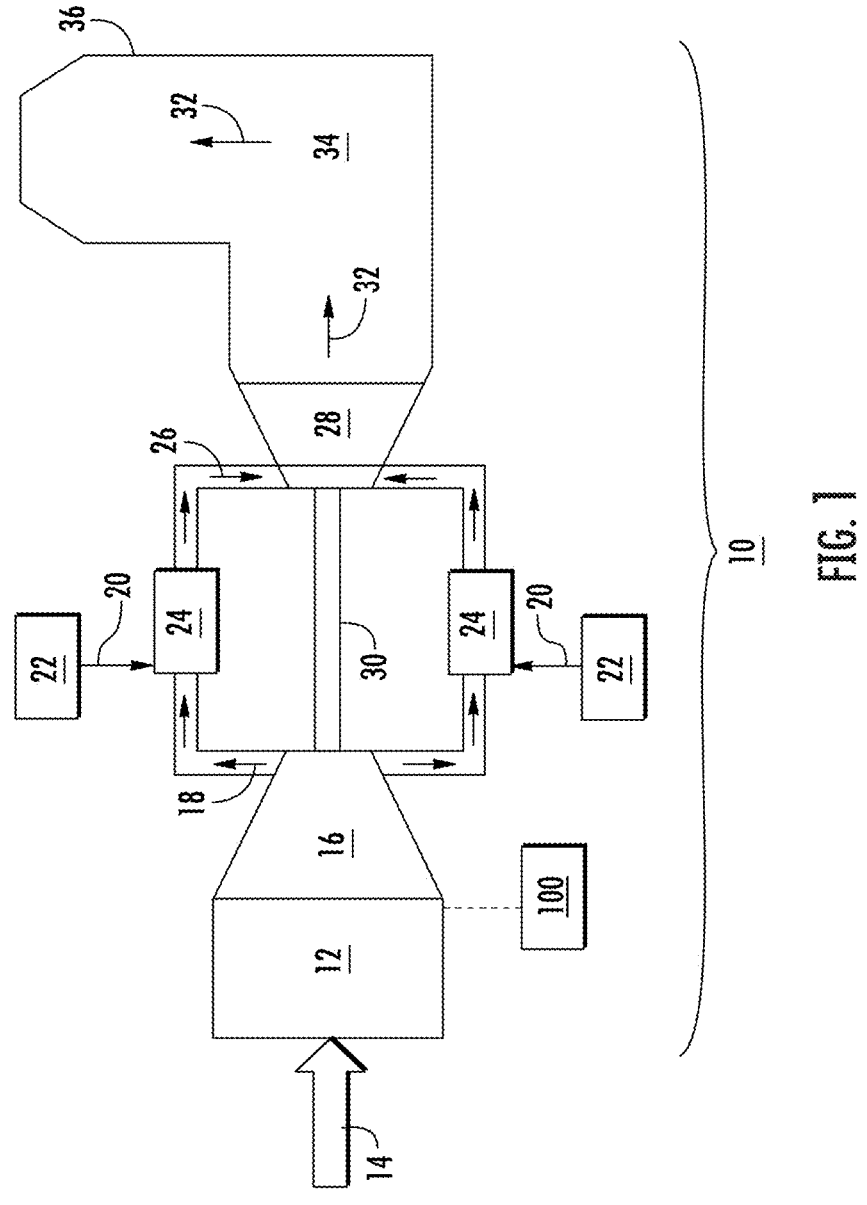
FIG. 1 provides a functional block diagram of an exemplary turbomachine that may incorporate various embodiments of the present technology.

Reference now will be made in detail to embodiments of the present systems and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the technology. As used herein, the terms "first," "second," and "third" may be used interchangeably to distinguish one component from another and are not intended to signify location or importance of the individual components.

The term "fluid" may be a gas or a liquid. The term "fluid communication" means that a fluid can make the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counterclockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Each example is provided by way of explanation of the technology, not limitation of the technology. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents. Although exemplary embodiments will be described generally in the context of an air supply and conditioning system for a land-based, power-generating gas turbine for purposes of illustration, one of ordinary skill in the art will readily appreciate that embodiments of the present technology may be applied to any inlet system for any type of turbomachine and are not limited to land-based, power-generating gas turbines unless specifically recited in the claims.

Referring now to the drawings, wherein identical numerals indicate the same elements throughout the figures, FIG. 1 provides a functional block diagram of an exemplary turbomachine, which in the illustrated exemplary embodiment is a gas turbine 10, that may incorporate various embodiments of the present technology. As shown, the gas turbine 10 generally includes an inlet system 12 that may include a series of filters, cooling coils, moisture separators, and/or other devices to purify and otherwise condition a flow of air or airstream 14 or other working fluid entering the gas turbine 10. The air 14 flows from the inlet system 12 to a compressor section where a compressor 16 progressively imparts kinetic energy to the air 14 to produce a compressed air 18.

The compressed air 18 is mixed with a fuel 20 from a fuel supply system 22 to form a combustible mixture within one or more combustors 24. The combustible mixture is burned to produce combustion gases 26 having a high temperature, pressure, and velocity. The combustion gases 26 flow through a turbine 28 of a turbine section to produce work. For example, the turbine 28 may be connected to a shaft 30 so that rotation of the turbine 28 drives the compressor 16 to produce the compressed air 18. Alternately or in addition, the shaft 30 may connect the turbine 28 to a generator (not shown) for producing electricity. Exhaust gases 32 from the turbine 28 flow through an exhaust section 34 that connects the turbine 28 to an exhaust stack 36 downstream from the turbine 28. The exhaust section 34 may include, for example, a heat recovery steam generator (not shown) for cleaning and extracting additional heat from the exhaust gases 32 prior to release to the environment.

In at least some embodiments, the turbomachine, e.g., gas turbine 10, may further include or be in operative communication with a processing device or a controller 100 that may be generally configured to facilitate operation of the turbomachine. In this regard, controller 100 may be in communication with various user input devices, sensors, and other control elements of the gas turbine 10, such that controller 100 may receive control inputs from the user input devices and may otherwise regulate operation of gas turbine 10. For example, signals generated by controller 100 may operate gas turbine 10, including any or all system components, subsystems, or interconnected devices, in response to the position of user input devices and other control commands. The user input devices, sensors, and other components of gas turbine 10 may be in communication with controller 100 via, for example, one or more signal lines or shared communication busses. In this manner, Input/Output ("I/O") signals may be routed between controller 100 and various operational components of gas turbine 10.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate turbomachine operation. Alternatively, controller 100 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 100 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 100 may be operable to execute programming instructions or micro-control code associated with an operating cycle of gas turbine 10. In this regard, the instructions may be software or any set of instructions that when executed by the processing device, cause the processing device to perform operations, such as running one or more software applications, displaying a user interface, receiving user input, processing user input, etc. Moreover, it should be noted that controller 100 as disclosed herein is capable of and may be operable to perform any methods, method steps, or portions of methods as disclosed herein. For example, in some embodiments, methods disclosed herein may be embodied in programming instructions stored in the memory and executed by controller 100.

The memory devices may also store data that can be retrieved, manipulated, created, or stored by the one or more processors or portions of controller 100. The data can include, for instance, data to facilitate performance of methods described herein. The data can be stored locally (e.g., on controller 100) in one or more databases and/or may be split up so that the data is stored in multiple locations. In addition, or alternatively, the one or more database(s) can be connected to controller 100 through any suitable network(s), such as through a high bandwidth local area network (LAN) or wide area network (WAN). In this regard, for example, controller 100 may further include a communication module or interface that may be used to communicate with one or more other component(s) of gas turbine 10, controller 100, an external controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

In various embodiments, the turbomachine 10 may include one or more power augmentation features, such as an inlet system (see, e.g., FIG. 2), a spray intercooling system (see, e.g., FIG. 3), other similar power augmentation features, and/or combinations of any one or more of such features.

Figure 2:
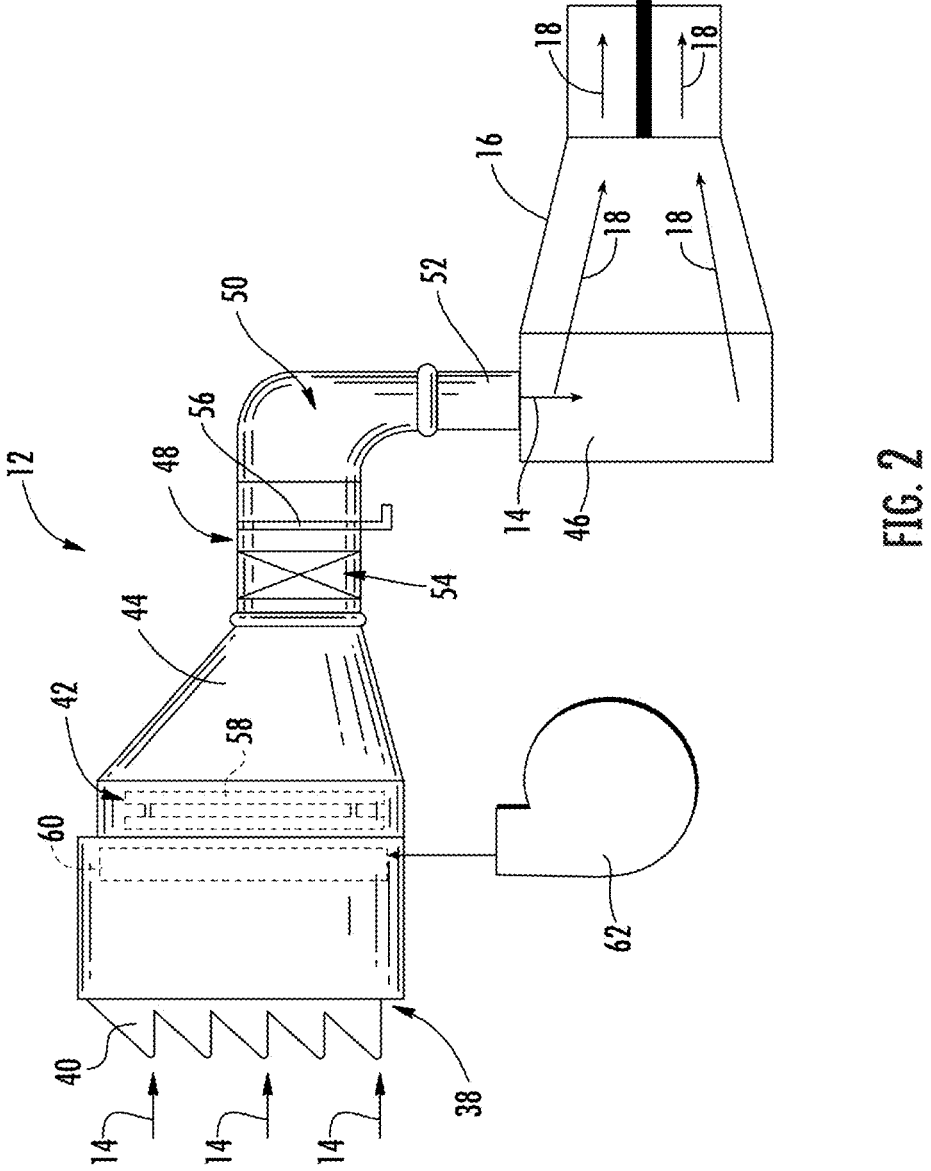
FIG. 2 provides a schematic block diagram of the turbomachine as shown in FIG. 1 including an exemplary embodiment of an inlet conditioning system according to one or more embodiments of the present disclosure.

FIG. 2 is a schematic illustration of an inlet system 12 for a turbomachine, such as the exemplary gas turbine 10 of FIG. 1. The inlet system 12 generally provides an air supply and conditioning system for the turbomachine and may also sometimes be referred to as an inlet conditioning system. As shown in FIG. 2, the inlet system 12 includes an inlet portion 38 that may include one or more weather hoods or louvers 40. The inlet portion 38 provides a flow path for the air 14 to enter a transition duct 42 from the ambient surroundings. An inlet duct 44 is configured to contain and route the air 14 to an inlet plenum 46.

The inlet duct 44 may include numerous sections that may vary in orientation and geometric configuration. For example, a first duct portion 48 is shown as having a relatively horizontal orientation prior to redirection through an elbow 50 to a second duct portion 52 having a relatively vertical orientation. Various other components may be disposed within either the first duct portion 48 or the second duct portion 52. Such components may include a silencer 54 and/or an inlet bleed heat arrangement 56. An inlet plenum 46 may be configured to provide a relatively turbulent-free region for immediate entry of the air 14 to the compressor 16. In various embodiments, the inlet system may include at least one, but typically a plurality of filters 58 (shown in dotted lines) in the transition duct 42.

An evaporative cooling unit 60 may be provided in the inlet system 12, such as adjoining or adjacent to the plurality of filters 58. For example, the evaporative cooling unit 60 may be positioned just upstream of the plurality of filters 58, such as the evaporative cooling unit 60 may be fastened (e.g., bolted) to an upstream side of a filter housing. The evaporative cooling unit 60 may, as discussed in further detail below, be useful (e.g., provide an increased power output and net economic benefit) when the ambient temperatures are relatively high and/or the ambient humidity is relatively low. Operating the evaporative cooling unit 60 provides an increased relative humidity and lower temperature intake air as compared to the ambient air. The evaporative cooling unit 60 may include, for example, one or more banks of evaporative cooling media, such as corrugated layers of fibrous material. An evaporative cooling fluid, such as water, may be supplied to the evaporative cooling unit 60, e.g., via a pump 62. The evaporative cooling fluid, e.g., water, may flow through the evaporative cooling media, e.g., downward under the influence of gravity. The inlet system may further include a piping loop (not specifically illustrated) whereby the evaporative cooling fluid, e.g., water, cycles back to the pump for continuous operation of the evaporative cooling unit 60 while the pump 62 remains activated.

Figure 3:
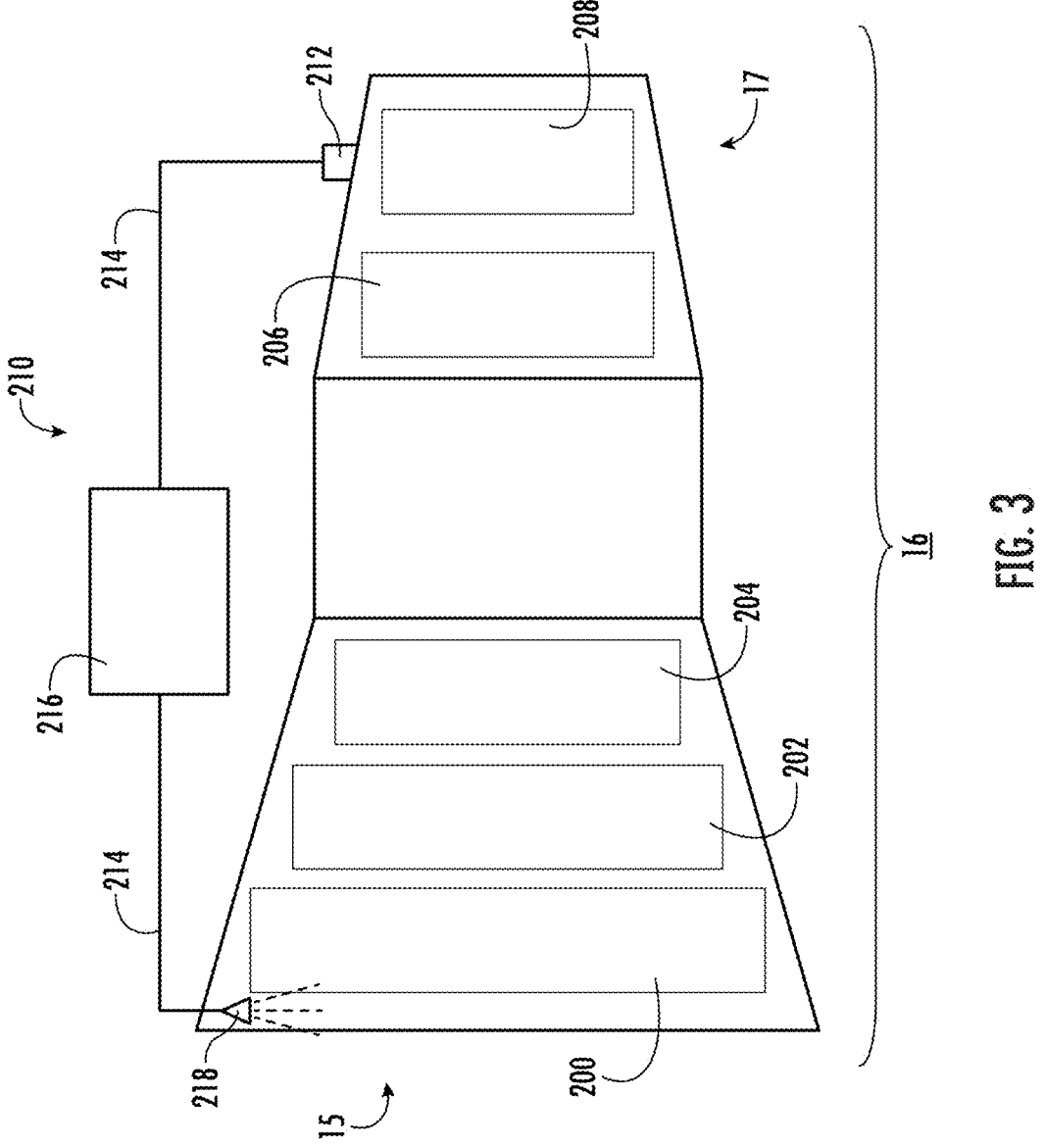
FIG. 3 provides a schematic block diagram of the turbomachine as shown in FIG. 1 including an exemplary embodiment of a spray intercooling system according to one or more embodiments of the present disclosure.

FIG. 3 provides a schematic illustration of a spray intercooling system 210 for a turbomachine, such as the exemplary gas turbine 10 of FIG. 1. The spray intercooling system 210 may generally increase the power output of the turbomachine, e.g., gas turbine 10, by cooling the combustion air which results in a higher mass flow through the compressor 16. Operating the spray intercooling system 210 may produce higher incremental output and better efficiency at higher ambient temperatures (e.g., at ambient temperatures at least above the freezing point of water (about 0° C. or 32° F.), such as at ambient temperatures greater than about 27° C. or 80° F.) and/or at higher elevations or other situations with lower barometric pressure. The spray intercooling system 210 may include a water supply 216 containing treated water and the water supply 216 may be connected to one or more conduits 214. The one or more conduits 214 may be coupled to a bleed port 212 at a later, high-pressure, stage of the compressor 16. The one or more conduits may couple the bleed port 212 to the water supply 216, whereby the pressurized air from the bleed port 212 mixes the water from the water supply 216 and transports the water through the one or more conduits 214 to one or more spray nozzles 218 positioned within a casing of the turbomachine at the compressor 16. Thus, the spray nozzle(s) 218 may provide a spray of water (e.g., the water may be atomized by the high-pressure air from the bleed port 212) into the compressor 16. As mentioned, the water may be treated, such as distilled, deionized, and/or demineralized, water.

As mentioned, the compressor 16 may include multiple stages which successively increase the pressure of air 18 (FIG. 1) flowing through the compressor 16. For example, the compressor 16 is illustrated with five stages in FIG. 3, a first stage 200, a second stage 202, a third stage 204, a fourth stage 206, and a fifth stage 208. As is generally understood by those of ordinary skill in the art, each stage includes a plurality of rotor blades and stator vanes, e.g., which may be arranged in annular arrays, such as around the shaft 30. In some embodiments, the compressor 16 may be divided into multiple distinct sections (each section having at least one stage) and the spray intercooling system 210 may extend between the sections. For example, as illustrated in FIG. 3, the compressor 16 may include a low-pressure compressor section 15 (e.g., with the first three stages of the compressor 16 in low-pressure section 15, as illustrated in FIG. 3) and a high-pressure compressor section 17 (e.g., with the final two stages of the compressor 16 in high-pressure section 17, as illustrated in FIG. 3). In additional embodiments, the compressor 16 may include less than five stages, or more than five stages, and the total number of stages may be provided in a single section or may be distributed in various combinations through the various sections of the compressor in embodiments where the compressor 16 includes two or more distinct sections. The spray nozzle 218 may be positioned and configured to spray into one or more sections, such as the inlet(s) of one or both of the sections. For example, the water, e.g., demineralized water, may be atomized with high-pressure compressed air from bleed port 212 at a high-pressure stage of the compressor 16 (e.g., a downstream stage such as a last stage, a next-to-last stage of the compressor, or other stage within the latter half of the compressor, such as within the latter one-third of the total number of compressor stages) and sprayed into the inlet(s) of the low-pressure compressor section 15 and/or high-pressure compressor section 17. The resulting combustion air cooling increases the air mass flow rate, which results in higher power output.

Figure 4:
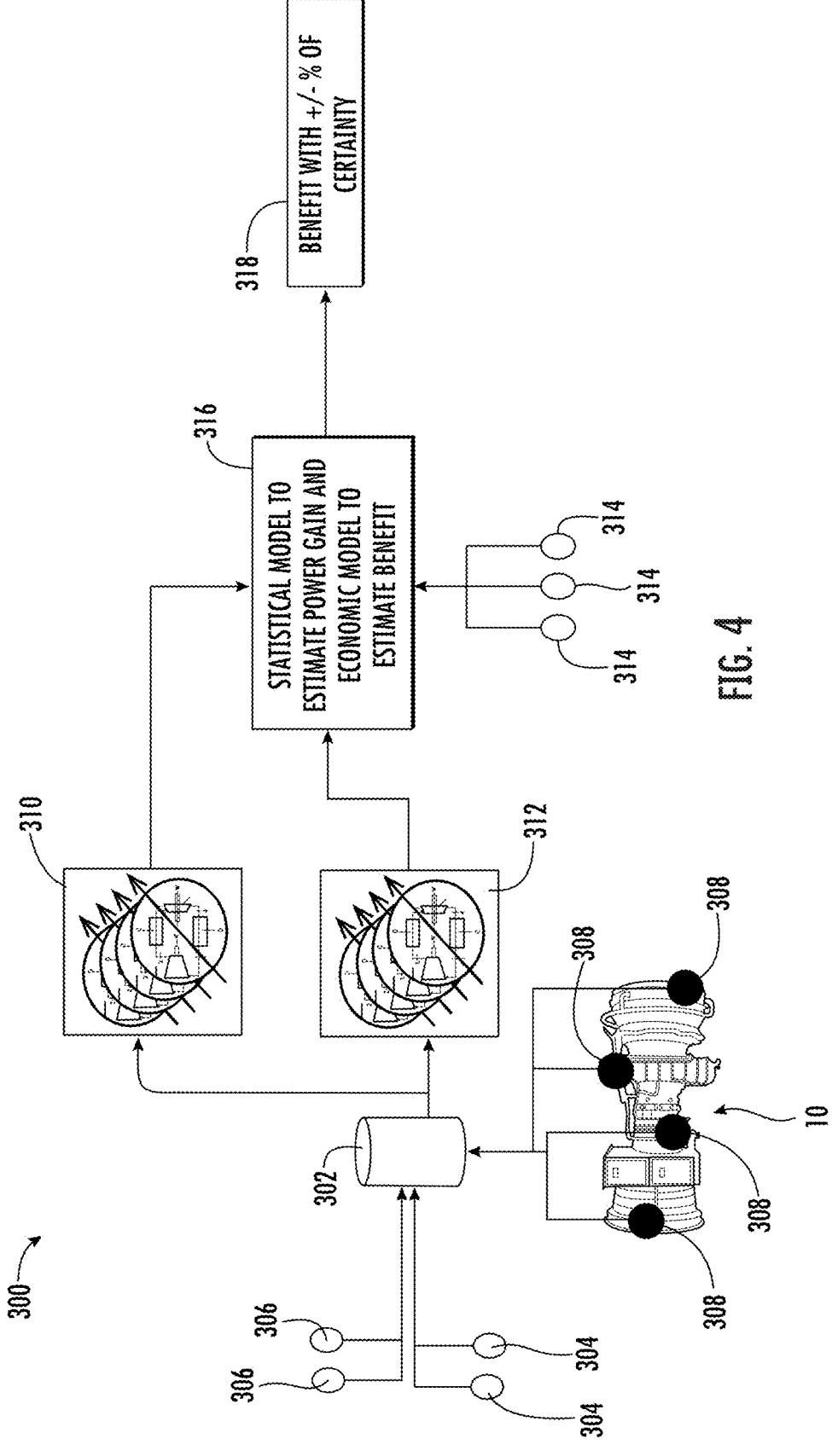
FIG. 4 provides a schematic of a power augmentation optimization system according to one or more embodiments of the present disclosure.

FIG. 4 provides a schematic of a power augmentation optimization system 300. The power augmentation optimization system 300 illustrated in FIG. 4 may be used with a variety of turbomachines, such as the exemplary gas turbine 10 described above. The power augmentation optimization system 300 may include an engine database 302, e.g., which may be implemented in a controller (such as controller 100 described above for example) of the turbomachine. The engine database 302 may be built using sensor data, such as real-time or periodically refreshed sensor data, and predicted or estimated data. For example, the engine database 302 may include current ambient conditions 304, such as data from site ambient sensors, which may include ambient temperature sensors and ambient humidity sensors and corresponding data generated from such sensors. The engine database 302 may further include predicted, e.g., forecast, data 306, which may represent forecast ambient conditions, e.g., temperature and humidity. Also, by way of example, one or more sensors 308 may be provided on the turbomachine, e.g., gas turbine 10. The engine database 302 may further include data from one or more of such engine sensors 308. For example, data from the engine sensors 308 may include temperature, humidity, and/or air pressure data from within the gas turbine 10, such as within one or more various sections or stages of the gas turbine 10. As discussed further below, data gathered by the engine sensors 308 may include pressure and/or temperature data from one or more stages of the compressor 16 of the gas turbine 10.

The engine database 302 may be used to predict or estimate future performance of the gas turbine 10. For example, the information in the engine database 302 may be input into an engine estimation model, and the engine estimation model may generate a predicted power without power augmentation (e.g., without inlet conditioning or spray intercooling) 310 and a predicted power with power augmentation (e.g., with one or both of inlet conditioning and spray intercooling) 312. For example, in embodiments which include both inlet conditioning and spray intercooling (or which otherwise include multiple power augmentation features), the engine estimation model may generate multiple predicted powers with power augmentation, such as a predicted power with inlet conditioning only, a predicted power with spray intercooling only, and a predicted power with both inlet conditioning and spray intercooling. These predicted powers, e.g., at least two predicted powers such as 310 and 312, may then be input into a statistical model, e.g., as indicated at 316 in FIG. 4, to estimate the power gain resulting from operating the power augmentation features (such as inlet conditioning system 12 and the evaporative cooling unit 60 thereof illustrated in FIG. 2 and described above, and/or the spray intercooling system 210 illustrated in FIG. 3 and described above). In some embodiments, the statistical model may be, for example, a Bayesian model, a Frequentist model, Maximum Likelihood Estimation, machine learning may be used, or any other suitable statistical model may be used.

Also as shown at 316 in FIG. 4, an economic model may be used to estimate the economic benefit of the estimated power gain. For example, the economic model may also receive one or more cost data inputs 314. Such cost data inputs 314 may be or may include fuel costs, water costs, and/or grid costs (e.g., grid pricing information, such as a prevailing or predicted rate per kilowatt). The system 300 illustrated in FIG. 4 may produce an output 318. The output 318 may be or may include an estimated benefit (e.g., net economic benefit based on the increased power production as a result of operating the one or more power augmentation features in view of the prevailing rate for such power as supplied to the grid in comparison with the associated costs, e.g., fuel and water costs (such as fuel cost savings versus increased water cost), incurred while operating the one or more power augmentation features). For example, when the ambient humidity (current and/or forecast) is relatively low, and/or the ambient temperature (current and/or forecast) is relatively high, operating the inlet system 12, evaporative cooling unit 60 thereof, and/or the spray intercooling system 210 is more likely to result in a sufficient power gain to be economically beneficial. As another example, when the prevailing rate for power is relatively low (such as during time periods of low demand) and/or the cost of water is high, the economic benefit of power gain from one or more of the power augmentation features is thereby diminished, such that the operation of the power augmentation features is less likely to provide a net economic benefit. The predicted benefit in the output 318 may include a confidence interval, e.g., may be provided with a percentage range of certainty, e.g., plus or minus ten percent (or other suitable percentage) of the predicted economic benefit.

The output 318, e.g., the estimated economic benefit and the associated certainty, may be provided in a user notification. In response to such notification, a user or operator of the turbomachine may opt to manually activate or deactivate the one or more power augmentation features (or otherwise adjust the operation of the one or more power augmentation features), e.g., by inputting an appropriate command to the controller 100 via one or more user input devices (e.g., physicals input devices such as switches or dials, and/or virtual input devices such as an icon or slider presented on an interactive computer display such as may be interacted with using a computer mouse, keyboard, touchscreen interface, or other similar user input devices).

Figure 5:
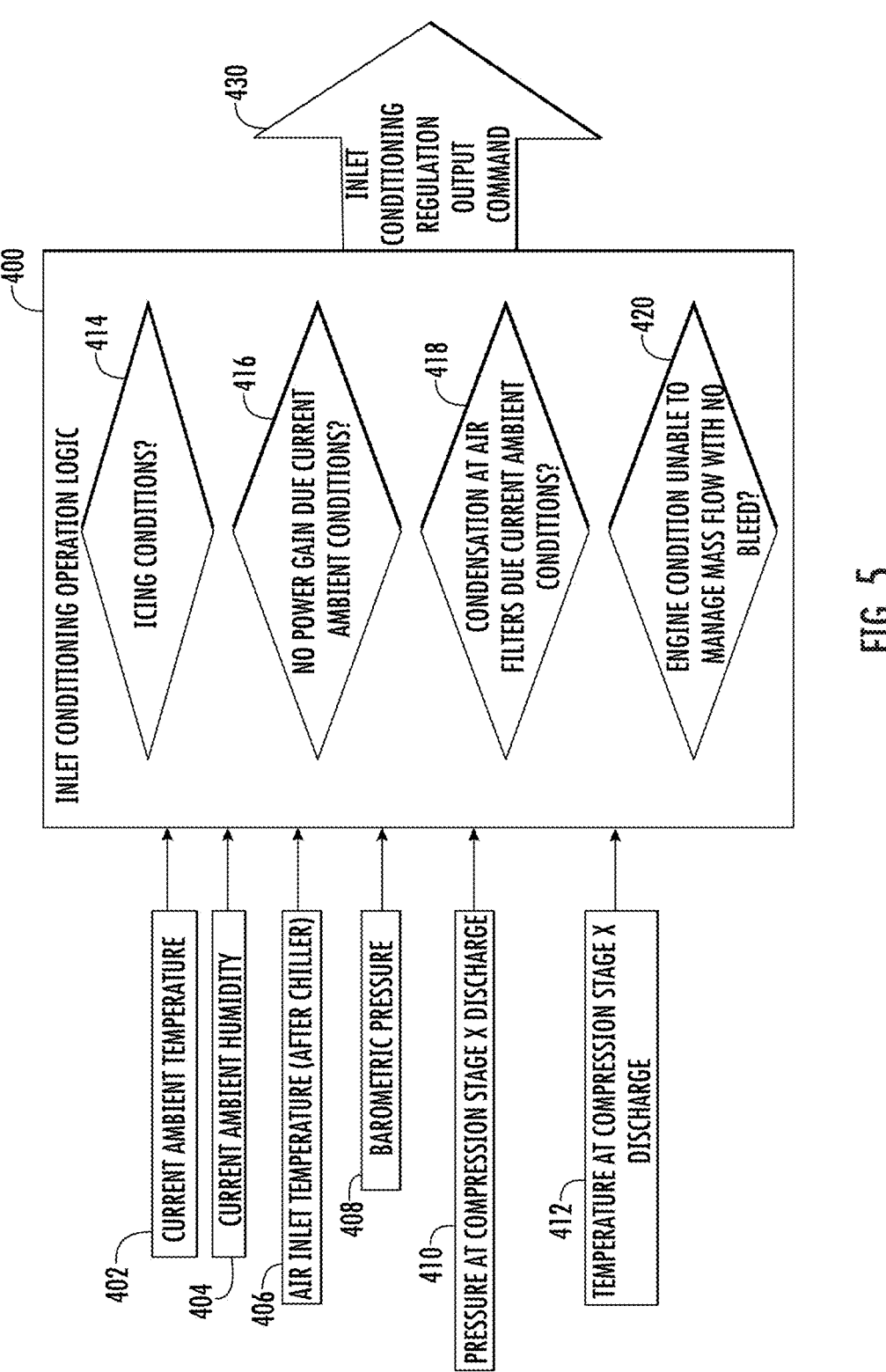
FIG. 5 provides a schematic of an inlet conditioning optimization logic according to one or more embodiments of the present disclosure.

Turning now to FIG. 5, in some embodiments, the one or more power augmentation features of the turbomachine, e.g., gas turbine 10, may be automatically controlled. FIG. 5 illustrates a particular example logic for the inlet conditioning system, e.g., the inlet conditioning system may be regulated by using an exemplary inlet conditioning operation logic 400 illustrated in FIG. 5 to generate or produce a command 430. The command 430 may be implemented by controller 100 without a user input, and command 430 may define the inlet conditioning regulation, e.g., proportional or on/off. Thus, the inlet system 12, e.g., evaporative cooling unit 60 thereof, may be adjusted (such as operated at a proportional level, e.g., a percentage of cooling capacity or high/medium/low cooling, etc.), activated, or deactivated by the controller 100 in response to the command 430. More generally, the inlet system 12 may be turned up, turned down, turned on, or turned off automatically (e.g., by controller 100 or other similar control device without user input) based on and in response to the command 430 that is output by the inlet conditioning operation logic 400. For example, the command 430 may include one or more temperature thresholds or temperature setpoints at which the evaporative cooling unit is activated or adjusted. Also, by way of example, the evaporative cooling unit may be activated or adjusted by turning on the water pump, e.g., pump 62, and/or adjusting the speed of the pump 62 (in embodiments where the pump is a variable speed pump). Further, it is to be understood that the exemplary inlet conditioning operation logic 400 of FIG. 5 may also be applied to other power augmentation features, e.g., the spray intercooling system 210, such as the spray intercooling system may be regulated automatically using a same or similar logic as the exemplary inlet conditioning operation logic 400 of FIG. 5 (e.g., the logic for the spray intercooling may be similar in that the only difference may be omission of an icing conditions decision function 414 described below where ice formation is generally recognized by those of ordinary skill in the art as unlikely in the compressor section of the turbomachine).

The inlet conditioning operation logic 400 may receive one or more data inputs, and the inlet conditioning operation logic 400 may determine, based on such data, the inlet conditioning regulation command 430. For example, the inlet conditioning operation logic 400 may analyze sensor readings (such as ambient condition sensors and/or engine sensors, e.g., as described above with reference to FIG. 4) in live mode, and may determine operation conditions of the turbomachine based on the recommendation from the statistical model (e.g., Bayesian model, etc., as described above) in order to generate the output comprising command 430 (e.g., command 430 may be based at least in part on the predicted power gain from the statistical model).

The inputs into inlet conditioning operation logic 400 may include current ambient temperature 402 and current ambient humidity 404. Such current ambient conditions may be measured by ambient sensors at the inlet of the turbomachine, e.g., similar to the data for ambient conditions 304 described above with reference to FIG. 4. The inputs into inlet conditioning operation logic 400 may also include an air inlet temperature 406 (e.g., which may be measured after the chiller, e.g., downstream of evaporative cooling unit 60, such as in the transition duct 42 or the inlet duct 44) and barometric pressure 408, such as an ambient barometric pressure. As with the ambient temperature 402 and current ambient humidity 404, the air inlet temperature 406 and barometric pressure 408 may be measured by sensors in the inlet system of the turbomachine.

The inputs into inlet conditioning operation logic 400 may further include engine conditions, e.g., from one or more engine sensors such as the engine sensors 308 (FIG. 4), such as pressure and temperature within the turbomachine. For example, the inputs into inlet conditioning operation logic 400 may include a compressor pressure, such as a pressure at compression stage X discharge 410, where stage "X" may be any suitable stage of the compressor 16, such as a final stage of compressor 16, an intermediate stage, or a first stage. The inputs into inlet conditioning operation logic 400 may further include a compressor temperature, such as temperature at compression stage X discharge 412.

The various inputs into inlet conditioning operation logic 400 may be used to inform one or more decision functions. For example, the inlet conditioning operation logic 400 may include one or more decision functions which inform the command 430 output from the inlet conditioning operation logic 400. For example, the inlet conditioning operation logic 400 may include decision functions to avoid one or more undesirable conditions such as icing, running the inlet conditioning without power gain, and/or condensation at air filter (e.g., which may allow fouling ingestion thus promoting performance loss). In other words, the inlet conditioning operation logic 400, and decision functions incorporated therein, may be provided to optimize the maximum power output and corresponding economic gain. In particular, the inlet conditioning operation logic 400 may include a decision function 414 of determining the presence (or extent) of icing conditions, which may be a binary determination (yes or no) of whether icing conditions are present, or may be a weighted prediction, such as a percentage, of likelihood of icing conditions. The inlet conditioning operation logic 400 may further include a decision function 416 of determining whether there will be no power gain from operating the inlet conditioning system due to current ambient conditions (such as when the current ambient air is relatively cool and/or damp). The inlet conditioning operation logic 400 may also include a decision function 418 of determining whether condensation at the air filters (e.g., the plurality of filters 58) will occur due to the current ambient conditions. In additional embodiments, the inlet conditioning operation logic 400 or other power augmentation operation logic may also or instead include a condensation decision function for determining whether (or to what extent) condensation will occur at other points in the turbomachine, e.g., in the compressor section. Additionally, the inlet conditioning operation logic 400 may include a decision function 420 of determining whether the conditions in the turbomachine, e.g., engine such as gas turbine 10, are such that the turbomachine is or will be unable to manage the mass flow with no bleed (e.g., without inlet bleed heating, as is generally understood by those of ordinary skill in the art).

In some embodiments, the inlet conditioning operation logic 400 may take into account a psychrometric chart of the evaporative cooling unit. For example, the inlet conditioning operation logic 400 may compare a current inlet temperature (e.g., downstream of the evaporative cooling unit, as mentioned above) to a theoretical inlet temperature if the evaporative cooling unit is turned on. The theoretical inlet temperature may be predicted based on the psychrometric chart, e.g., with reference to the current ambient humidity and the current ambient temperature to look up the theoretical inlet temperature on the psychrometric chart of the evaporative cooling unit. The comparison of the current inlet temperature and the theoretical inlet temperature may include determining a mathematical difference between the current inlet temperature and the theoretical inlet temperature, such as subtracting the theoretical inlet temperature from the current inlet temperature. In such embodiments, the evaporative cooling unit may be operated based on the comparison of the current inlet temperature and the theoretical inlet temperature. For example, if the mathematical difference between the current inlet temperature and the theoretical inlet temperature is greater than a predetermined threshold value, the evaporative cooling unit may be turned on, and when the mathematical difference between the current inlet temperature and the theoretical inlet temperature is equal to or less than the predetermined threshold value, the evaporative cooling unit may be turned off. The predetermined threshold value may be between about three degrees Fahrenheit (3° F.) and about ten degrees Fahrenheit (10° F.), such as about 5° F.

The inlet conditioning operation logic 400 may also monitor the inlet temperature to ensure that the inlet temperature remains above a freezing limit, such as the freezing limit may be at least a safety factor above the freezing point of water (e.g., the freezing limit may be greater than the freezing point of water). For example, the freezing limit may be at least about ten degrees above the freezing point of water, such as the freezing limit may be about forty-two degrees Fahrenheit (42° F.). In additional examples, the freezing limit may be between about 40° F. and about 55° F., such as between about 45° F. and about 50° F., such as the freezing limit may be about 40° F., about 45° F., or other similar temperature values. In such embodiments, the inlet conditioning operation logic 400 may compare the current inlet temperature to the freezing limit and/or the theoretical inlet temperature to the freezing limit. For example, in some embodiments, the evaporative cooling unit may be activated when the current inlet temperature is greater than the freezing limit, the theoretical inlet temperature is greater than the freezing limit, and/or when the mathematical difference between the current inlet temperature and the theoretical inlet temperature is greater than the predetermined threshold value. In some embodiments, the evaporative cooling unit may be activated (e.g., the command 430 output from the inlet conditioning operation logic 400 may be a command to turn up or turn on the evaporative cooling unit) only when all three conditions are present, or when at least one of the current inlet temperature and the theoretical inlet temperature is above the freezing limit and the mathematical difference between the current inlet temperature and the theoretical inlet temperature is greater than the predetermined threshold value, or the evaporative cooling unit may be activated in response to other various combinations of such conditions.

Figure 6:
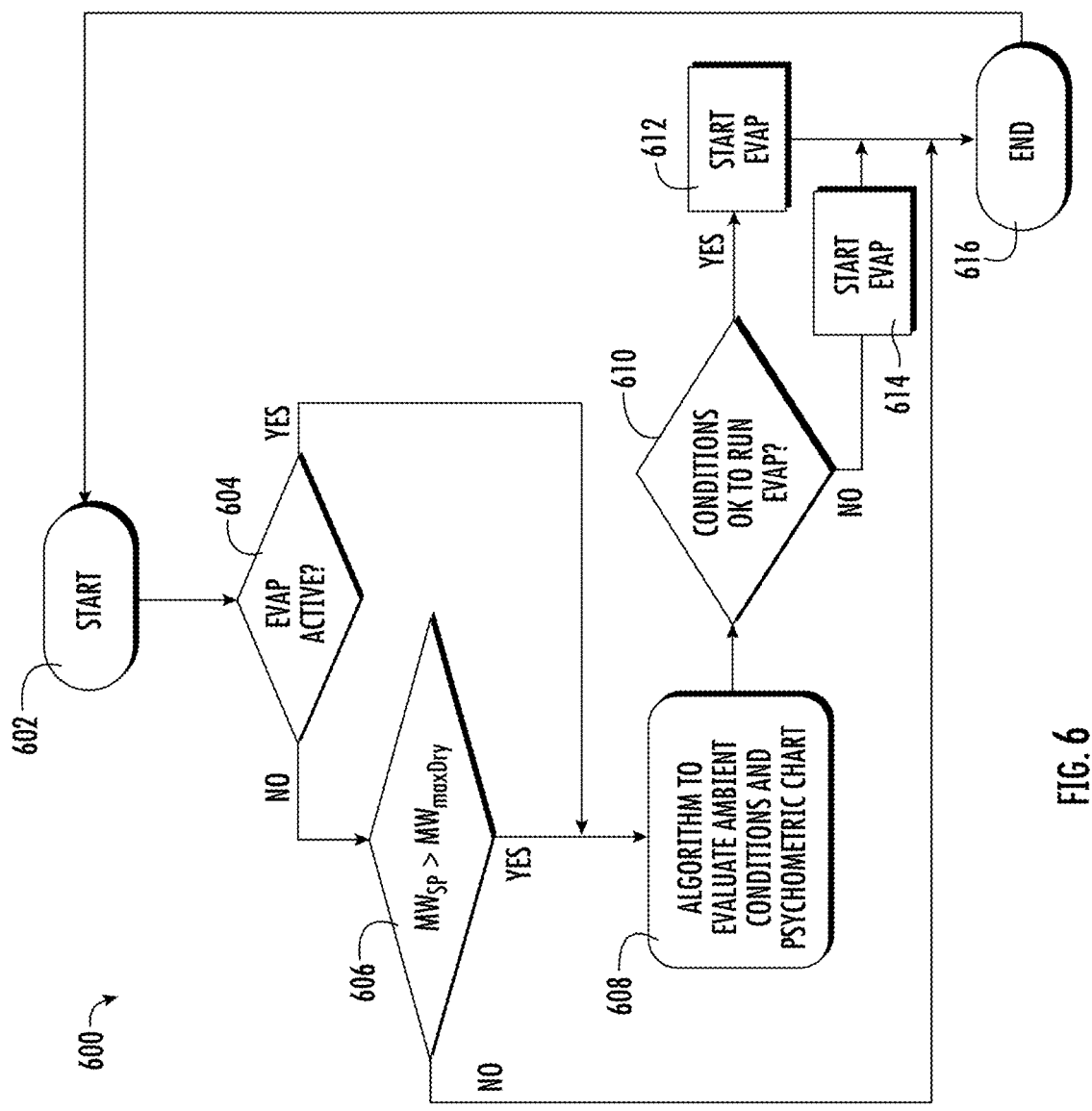
FIG. 6 provides a flowchart diagram of an exemplary method of operating a power augmentation feature of a turbomachine according to one or more embodiments of the present disclosure.
Figure 7:
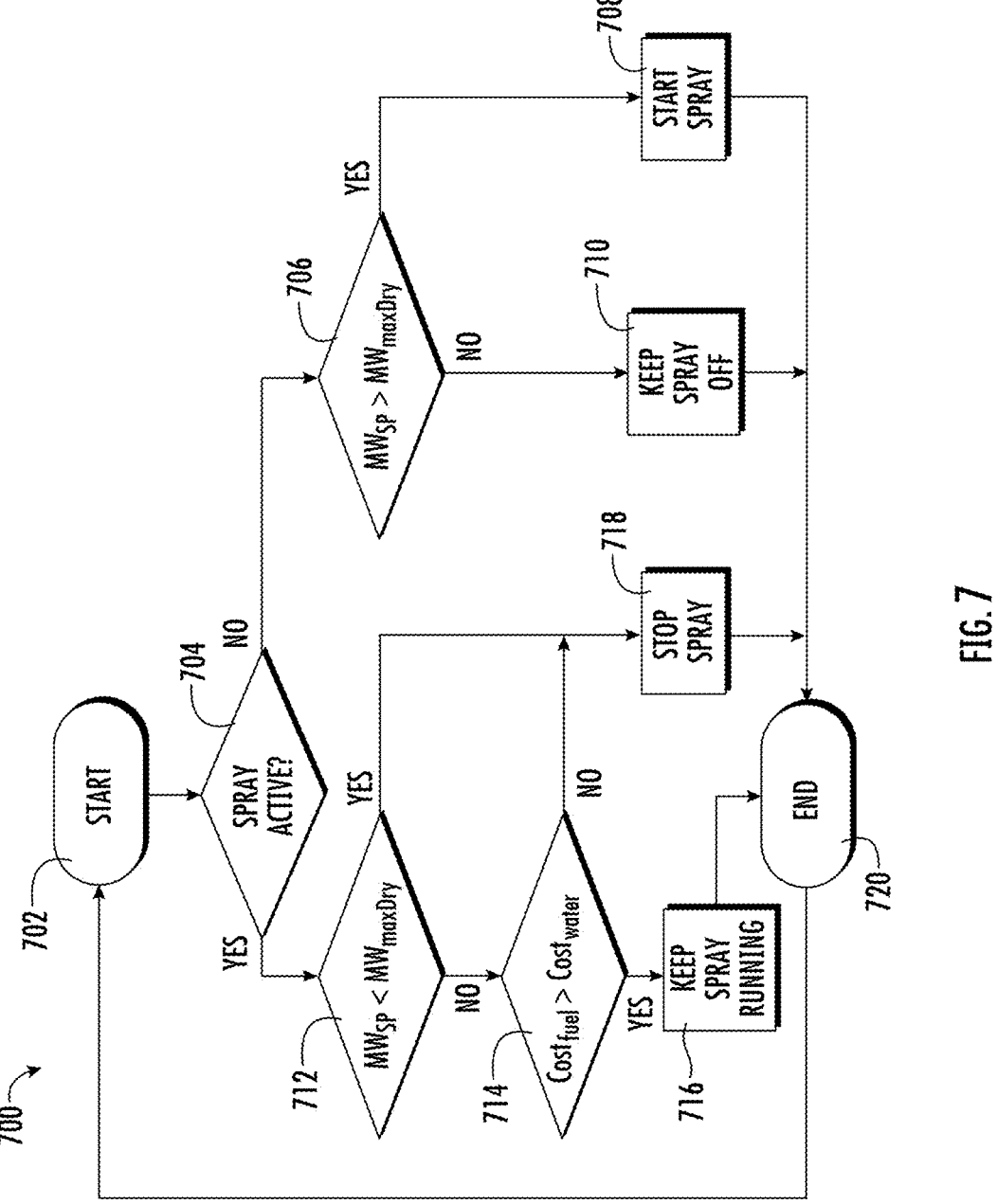
FIG. 7 provides a flowchart diagram of an exemplary method of operating another power augmentation feature of a turbomachine according to one or more embodiments of the present disclosure; and, FIG. 8 provides a flowchart diagram of an exemplary method of operating a turbomachine according to one or more embodiments of the present disclosure.
Figure 8:
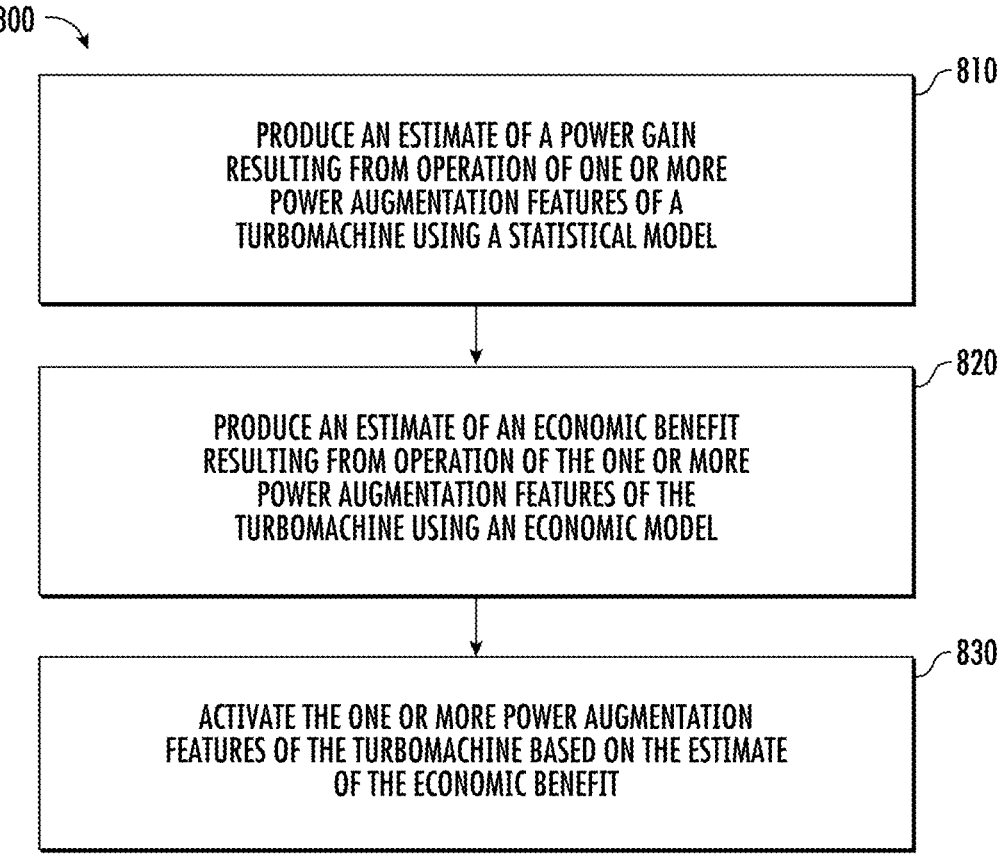

Referring now to FIGS. 6, 7, and 8, embodiments of the present disclosure also include methods of operating a turbomachine, such as an exemplary method 600 illustrated in FIG. 6, an exemplary method 700 illustrated in FIG. 7, and an exemplary method 800 illustrated in FIG. 8. Such methods may be used to operate any suitable turbomachine, such as but not limited to the exemplary gas turbine 10 described above.

Referring now to FIG. 6, the exemplary method 600 according to embodiments of the present disclosure may be used for operating a power augmentation feature, e.g., an inlet conditioning system including an evaporative cooler, of a turbomachine. The method 600 may begin with a start 602 and may include an evaporative cooling status check decision function, e.g., as illustrated at (604) in FIG. 6, method 600 may include determining whether the evaporative cooling is active.

When the evaporative cooling is not active, e.g., when the outcome of the decision function at (604) is negative, the method 600 may proceed to (606) a power gain determination, e.g., a comparison function wherein a power setpoint (MWSP) is compared to the power produced without operating the power augmentation feature (MWMAXDRY). The power setpoint MWSP may represent or be responsive to the current demand for power to be supplied, e.g., to the grid. In particular, as indicated at (606) in FIG. 6, method 600 may include determining whether the MWSP is greater than the MWMAXDRY. When the MWSP is not greater than (e.g., is less than) the MWMAXDRY, method 600 may proceed to end 616. For example, when the demand for power is low and MWSP is consequently low, e.g., less than MWMAXDRY, the economic benefit of operating the power augmentation feature, e.g., evaporative cooling or other inlet conditioning, may not be sufficient to justify turning on the evaporative cooling (or other power augmentation feature), and the method 600 may thus end.

As illustrated in FIG. 6, when the evaporative cooling is active, e.g., when the result of decision function (604) is positive ("Yes"), or when the MWSP is greater than the MWMAXDRY at (606), method 600 may proceed to process function (608). Process function (608) may include evaluating one or more ambient conditions (e.g., ambient temperature and/or humidity), such as icing conditions, etc., as described above with respect to FIG. 5, and such evaluation may also use a psychrometric chart, also as described above with respect to FIG. 5. Based on the evaluation at (608), a determination may be made whether the ambient conditions are suitable for evaporative cooling, e.g., method 600 may proceed to a decision function (610) that includes determining whether the conditions are OK to run the evaporative cooling.

When the conditions are OK to run the evaporative cooling, method 600 may proceed to (612) and start the evaporative cooling (or continue to run the evaporative cooling if already active). When one or more ambient conditions are not suitable for evaporative cooling, method 600 may proceed to (614) and stop the evaporative cooling (or leave the evaporative cooling off if already inactive). Method 600 may then proceed to end 616. Method 600 may also be recursive, e.g., in some embodiments, method 600 may return to start 602 from the end 616.

Referring now to FIG. 7, the exemplary method 700 according to embodiments of the present disclosure may be used for operating a power augmentation feature, e.g., a spray intercooling system, of a turbomachine. Method 700 may begin with start 702 and may include a spray intercooling status check decision function, e.g., as illustrated at (704) in FIG. 7, method 700 may include determining whether the spray intercooling is active.

When the spray intercooling is not active, e.g., when the outcome of the decision function at (704) is negative, the method 700 may proceed to (706) a power gain determination, e.g., a comparison function wherein a power setpoint (MWSP) is compared to the power produced without operating the power augmentation feature (MWMAXDRY). The power setpoint MWSP may represent or be responsive to a current demand for power to be supplied, e.g., to the grid. In particular, as indicated at (706) in FIG. 7, method 700 may include determining whether the MWSP is greater than the MWMAXDRY. When the MWSP is not greater than (e.g., is less than) the MWMAXDRY, method 700 may proceed to (710) and keep the spray intercooling off. When the MWSP is greater than the MWMAXDRY, method 700 may proceed to (708) and start the spray intercooling.

When the spray intercooling is active, e.g., when the outcome of the decision function at (704) is positive, the method 700 may proceed to (712) a power gain determination, e.g., a comparison function wherein a power setpoint (MWSP) is compared to the power produced without operating the power augmentation feature (MWMAXDRY). The power setpoint MWSP may represent or be responsive to a current demand for power to be supplied, e.g., to the grid. In particular, as indicated at (712) in FIG. 7, method 700 may include determining whether the MWSP is less than the MWMAXDRY. When the MWSP is less than the MWMAXDRY, method 700 may stop the spray intercooling, e.g., as indicated at (718) in FIG. 7.

When the MWSP is not less than (e.g., is greater than) the MWMAXDRY, method 700 may proceed to an economic determination. For example, as illustrated at (714) in FIG. 7, method 700 may include comparing the cost of fuel (where fuel consumption per power output would be reduced if the power augmentation feature, e.g., spray intercooling, is operated) with the cost of water (e.g., the cost of water consumed when the spray intercooling is operating). When the cost of fuel (Costfuel in FIG. 7) is greater than the cost of water (Costwater in FIG. 7), operating the spray intercooling may thus provide a net economic benefit by reducing the fuel consumption in spite of the additional water consumption, and as a result method 700 may keep the spray intercooling running, e.g., as indicated at (716) in FIG. 7. When the cost of fuel (Costfuel in FIG. 7) is not greater than (e.g., is less than) the cost of water (Costwater in FIG. 7), operating the spray intercooling may thus not provide a net economic benefit due to the cost of the water consumed during operation of the spray intercooling. Accordingly, when the outcome of (714) is negative, method 700 may stop the spray intercooling, e.g., as indicated at (718) in FIG. 7.

Once a process function of keep spraying (716), stop spraying (718), keep the spray intercooling off (710), or start the spray intercooling (708) has been performed, the method 700 may end at (720). Method 700 may also be recursive, e.g., in some embodiments, method 700 may return to start 702 from the end 720.

Referring now to FIG. 8, methods according to embodiments of the present disclosure, e.g., method 800 of operating a turbomachine, may include (810) producing an estimate of a power gain resulting from operation of one or more power augmentation features of the turbomachine. The one or more power augmentation features may include an inlet conditioning system, a spray intercooling system, other similar power augmentation features, and combinations of one or more such features. The estimate of power gain may be produced using a statistical model, such as a Bayesian model or other similar statistical model as noted above. Activating the one or more power augmentation features of the turbomachine may include activating at least one of the inlet conditioning system and the spray intercooling system based on the estimate of the economic benefit.

For example, method 800 may also include sensing current ambient conditions using sensors in an inlet section of the turbomachine and forecasting future ambient conditions. In such embodiments, estimate of the power gain may be based on the current ambient conditions and the future ambient conditions. In such embodiments, the current ambient conditions may include current ambient temperature, current ambient humidity, and current barometric pressure, and the future ambient conditions may include future ambient temperature, future ambient humidity, and future barometric pressure.

Also by way of example, method 800 may further include producing an estimate of an inlet temperature at an inlet section of the turbomachine resulting from operation of one or more power augmentation features, such as an evaporative cooler (e.g., the evaporative cooling unit 60) of the inlet conditioning system or a spray intercooling system at the compressor of the turbomachine. In such embodiments, the estimate of the power gain resulting from operation of the one or more power augmentation features may be based on the estimate of the inlet temperature. Such embodiments may also include comparing the estimate of the inlet temperature to a temperature threshold, such as the freezing limit described above. In some embodiments, the power augmentation feature(s) may be or may include an inlet conditioning system, such that activating the one or more power augmentation features of the turbomachine based on the estimate of the economic benefit is or includes activating the inlet conditioning system. In such embodiments, activating the inlet conditioning system of the turbomachine may include activating the evaporative cooler, and the evaporative cooler may be activated based on the estimate of the inlet temperature being greater than the temperature threshold.

Also as illustrated in FIG. 8, in some embodiments method 800 may include (820) producing an estimate of an economic benefit resulting from operation of the one or more power augmentation features of the turbomachine. For example, the estimate of the economic benefit may be produced using an economic model. In some embodiments, the estimate of the economic benefit produced using the economic model may be based on the estimate of the power gain produced by the statistical model. For example, the gross economic benefit resulting from operation of the one or more power augmentation features may be estimated by multiplying the estimated power gain by a prevailing rate for power supplied to the grid (such as in units of currency per kilowatt, e.g., dollars per kW, or other local currency depending on where the turbomachine is located). In some embodiments, the estimate of the economic benefit produced using the economic model may be based on fuel costs, water costs, and power grid pricing. For example, the net economic benefit resulting from operation of the one or more power augmentation features may be estimated or determined by subtracting the increased water costs resulting from operation of the one or more power augmentation features from the gross economic benefit resulting from operation of the one or more power augmentation features (where the gross economic benefit may be determined or estimated with reference to the power grid pricing).

In some embodiments, e.g., as illustrated in FIG. 8, method 800 may include (830) activating the one or more power augmentation features of the turbomachine based on the estimate of the economic benefit. In various embodiments, the one or more power augmentation features may be activated manually (e.g., in response to an operator input) or automatically (e.g., without an operator input, such as based on the estimate of the economic benefit alone). For example, in some embodiments, method 800 may also include providing an operator notification of the estimate of the economic benefit resulting from operation of the one or more power augmentation features of the turbomachine and receiving an operator input after providing the operator notification. In such embodiments, activating the one or more power augmentation features of the turbomachine based on the estimate of the economic benefit may further be in response to the operator input.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method of operating a turbomachine, the method comprising producing, using a statistical model, an estimate of a power gain resulting from operation of one or more power augmentation features of the turbomachine, producing, using an economic model, an estimate of an economic benefit resulting from operation of the one or more power augmentation features of the turbomachine, and activating the one or more power augmentation features of the turbomachine based on the estimate of the economic benefit.

The method of one or more of these clauses, wherein the estimate of the economic benefit produced using the economic model is based on the estimate of the power gain produced by the statistical model.

The method of one or more of these clauses, wherein the estimate of the economic benefit produced using the economic model is based on fuel costs, water costs, and power grid pricing.

The method of one or more of these clauses, wherein the one or more power augmentation features of the turbomachine comprises an inlet conditioning system and a spray intercooling system, wherein activating the one or more power augmentation features of the turbomachine comprises activating at least one of the inlet conditioning system and the spray intercooling system based on the estimate of the economic benefit.

The method of one or more of these clauses, further comprising sensing current ambient conditions using sensors in an inlet section of the turbomachine, and forecasting future ambient conditions, wherein the estimate of the power gain is based on the current ambient conditions and the future ambient conditions.

The method of one or more of these clauses, wherein the current ambient conditions comprise current ambient temperature, current ambient humidity, and current barometric pressure, and wherein the future ambient conditions comprise future ambient temperature, future ambient humidity, and future barometric pressure.

The method of one or more of these clauses, further comprising sensing pressure and temperature within the turbomachine using one or more sensors in a compressor section of the turbomachine, wherein the estimate of the power gain is based on the sensed pressure and temperature.

The method of one or more of these clauses, wherein the one or more power augmentation features of the turbomachine comprises an inlet conditioning system, further comprising producing an estimate of an inlet temperature at an inlet section of the turbomachine resulting from operation of an evaporative cooler of the inlet conditioning system, wherein the estimate of the power gain resulting from operation of the one or more power augmentation features is based on the estimate of the inlet temperature.

The method of one or more of these clauses, further comprising comparing the estimate of the inlet temperature to a temperature threshold, wherein activating the one or more power augmentation features of the turbomachine comprises activating the evaporative cooler of the inlet conditioning systems, and wherein activating the evaporative cooler is based on the estimate of the inlet temperature being greater than the temperature threshold.

The method of one or more of these clauses, further comprising providing an operator notification of the estimate of the economic benefit resulting from operation of the one or more power augmentation features of the turbomachine, and receiving an operator input after providing the operator notification, wherein activating the one or more power augmentation features of the turbomachine based on the estimate of the economic benefit is further in response to the operator input.

Further aspects of the invention are provided by the subject matter of the following clauses:

A turbomachine, comprising one or more power augmentation features and a controller in operative communication with the inlet conditioning system, the controller configured for producing, using a statistical model, an estimate of a power gain resulting from operation of the one or more power augmentation features of the turbomachine, producing, using an economic model, an estimate of an economic benefit resulting from operation of the one or more power augmentation features of the turbomachine, and activating the one or more power augmentation features of the turbomachine based on the estimate of the economic benefit.

The system of one or more of these clauses, wherein the estimate of the economic benefit produced using the economic model is based on the estimate of the power gain produced by the statistical model.

The system of one or more of these clauses, wherein the estimate of the economic benefit is produced using the economic model is based on fuel costs, water costs, and power grid pricing.

The system of one or more of these clauses, wherein the one or more power augmentation features of the turbomachine comprises an inlet conditioning system and a spray intercooling system, wherein activating the one or more power augmentation features of the turbomachine comprises activating at least one of the inlet conditioning system and the spray intercooling system based on the estimate of the economic benefit.

The system of one or more of these clauses, further comprising sensors in an inlet section of the turbomachine, wherein the controller is further configured for sensing current ambient conditions using the sensors in the inlet section of the turbomachine, and is further configured for forecasting future ambient conditions, wherein the estimate of the power gain is based on the current ambient conditions and the future ambient conditions.

The system of one or more of these clauses, wherein the current ambient conditions comprise current ambient temperature, current ambient humidity, and current barometric pressure, and wherein the future ambient conditions comprise future ambient temperature, future ambient humidity, and future barometric pressure.

The system of one or more of these clauses, further comprising one or more sensors in a compressor section of the turbomachine, wherein the controller is further configured for sensing pressure and temperature within the turbomachine using the one or more sensors in the compressor section of the turbomachine, wherein the estimate of the power gain is based on the sensed pressure and temperature.

The system of one or more of these clauses, wherein the one or more power augmentation features of the turbomachine comprises an inlet conditioning system, wherein the inlet conditioning system includes an evaporative cooler, wherein the controller is further configured for producing an estimate of an inlet temperature at an inlet section of the turbomachine resulting from operation of the evaporative cooler of the inlet conditioning system, wherein the estimate of the power gain resulting from operation of the one or more power augmentation features is based on the estimate of the inlet temperature.

The system of one or more of these clauses, wherein controller is further configured for comparing the estimate of the inlet temperature to a temperature threshold, and wherein activating the one or more power augmentation features of the turbomachine comprises activating the evaporative cooler of the inlet conditioning system, and wherein activating the evaporative cooler is based on the estimate of the inlet temperature being greater than the temperature threshold.

The system of one or more of these clauses, wherein controller is further configured for providing an operator notification of the estimate of the economic benefit resulting from operation of the one or more power augmentation features of the turbomachine and receiving an operator input after providing the operator notification, wherein activating the one or more power augmentation features of the turbomachine based on the estimate of the economic benefit is further in response to the operator input.

What is claimed is:

1. A method of operating a turbomachine, the method comprising:

producing, using a statistical model, an estimate of a power gain resulting from operation of one or more power augmentation features of the turbomachine;

producing, using an economic model, an estimate of an economic benefit resulting from operation of the one or more power augmentation features of the turbomachine; and, activating the one or more power augmentation features of the turbomachine based on the estimate of the economic benefit.

2. The method of claim 1, wherein the estimate of the economic benefit produced using the economic model is based on the estimate of the power gain produced by the statistical model.

3. The method of claim 1, wherein the estimate of the economic benefit produced using the economic model is based on fuel costs, water costs, and power grid pricing.

4. The method of claim 1, wherein the one or more power augmentation features of the turbomachine comprises an inlet conditioning system and a spray intercooling system, wherein activating the one or more power augmentation features of the turbomachine comprises activating at least one of the inlet conditioning system and the spray intercooling system based on the estimate of the economic benefit.

5. The method of claim 1, further comprising sensing current ambient conditions using sensors in an inlet section of the turbomachine, and forecasting future ambient conditions, wherein the estimate of the power gain is based on the current ambient conditions and the future ambient conditions.

6. The method of claim 5, wherein the current ambient conditions comprise current ambient temperature, current ambient humidity, and current barometric pressure, and wherein the future ambient conditions comprise future ambient temperature, future ambient humidity, and future barometric pressure.

7. The method of claim 1, further comprising sensing pressure and temperature within the turbomachine using one or more sensors in a compressor section of the turbomachine, wherein the estimate of the power gain is based on the sensed pressure and temperature.

8. The method of claim 1, wherein the one or more power augmentation features of the turbomachine comprises an inlet conditioning system, further comprising producing an estimate of an inlet temperature at an inlet section of the turbomachine resulting from operation of an evaporative cooler of the inlet conditioning system, wherein the estimate of the power gain resulting from operation of the one or more power augmentation features is based on the estimate of the inlet temperature.

9. The method of claim 8, further comprising comparing the estimate of the inlet temperature to a temperature threshold, wherein activating the one or more power augmentation features of the turbomachine comprises activating the evaporative cooler of the inlet conditioning system, and wherein activating the evaporative cooler is based on the estimate of the inlet temperature being greater than the temperature threshold.

10. The method of claim 1, further comprising providing an operator notification of the estimate of the economic benefit resulting from operation of the one or more power augmentation features of the turbomachine, and receiving an operator input after providing the operator notification, wherein activating the one or more power augmentation features of the turbomachine based on the estimate of the economic benefit is further in response to the operator input.

11. A turbomachine, comprising:
one or more power augmentation features; and,
a controller in operative communication with the one or more power augmentation features, the controller configured for:
producing, using a statistical model, an estimate of a power gain resulting from operation of the one or more power augmentation features;
producing, using an economic model, an estimate of an economic benefit resulting from operation of the one or more power augmentation features of the turbomachine; and,
activating the one or more power augmentation features of the turbomachine based on the estimate of the economic benefit.

12. The turbomachine of claim 11, wherein the estimate of the economic benefit produced using the economic model is based on the estimate of the power gain produced by the statistical model.

13. The turbomachine of claim 11, wherein the estimate of the economic benefit is produced using the economic model, is based on fuel costs, water costs, and power grid pricing.

14. The turbomachine of claim 11, wherein the one or more power augmentation features of the turbomachine comprises an inlet conditioning system and a spray intercooling system, wherein activating the one or more power augmentation features of the turbomachine comprises activating at least one of the inlet conditioning system and the spray intercooling system based on the estimate of the economic benefit.

15. The turbomachine of claim 11, further comprising sensors in an inlet section of the turbomachine, wherein the controller is further configured for sensing current ambient conditions using the sensors in the inlet section of the turbomachine, and is further configured for forecasting future ambient conditions, wherein the estimate of the power gain is based on the current ambient conditions and the future ambient conditions.

16. The turbomachine of claim 15, wherein the current ambient conditions comprise current ambient temperature, current ambient humidity, and current barometric pressure, and wherein the future ambient conditions comprise future ambient temperature, future ambient humidity, and future barometric pressure.

17. The turbomachine of claim 11, further comprising one or more sensors in a compressor section of the turbomachine, wherein the controller is further configured for sensing pressure and temperature within the turbomachine using the one or more sensors in the compressor section of the turbomachine, wherein the estimate of the power gain is based on the sensed pressure and temperature.

18. The turbomachine of claim 11, wherein the one or more power augmentation features of the turbomachine comprises an inlet conditioning system, wherein the inlet conditioning system includes an evaporative cooler, wherein the controller is further configured for producing an estimate of an inlet temperature at an inlet section of the turbomachine resulting from operation of the evaporative cooler of the inlet conditioning system, wherein the estimate of the power gain resulting from operation of the one or more power augmentation features is based on the estimate of the inlet temperature.

19. The turbomachine of claim 18, wherein the controller is further configured for comparing the estimate of the inlet temperature to a temperature threshold, and wherein activating the one or more power augmentation features of the turbomachine comprises activating the evaporative cooler of the inlet conditioning system, and wherein activating the evaporative cooler is based on the estimate of the inlet temperature being greater than the temperature threshold.

20. The turbomachine of claim 11, wherein the controller is further configured for providing an operator notification of the estimate of the economic benefit resulting from operation of the one or more power augmentation features of the turbomachine and receiving an operator input after providing the operator notification, wherein activating the one or more power augmentation features of the turbomachine based on the estimate of the economic benefit is further in response to the operator input.

* * * * *